Jan. 4, 1938.　　　M. A. SCHWARTZ　　　2,104,246
CENTRIFUGAL VACUUM PUMP
Filed June 22, 1935　　2 Sheets-Sheet 1
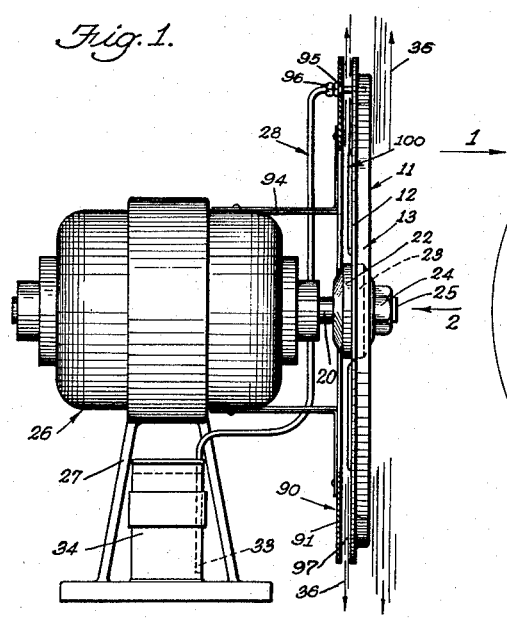
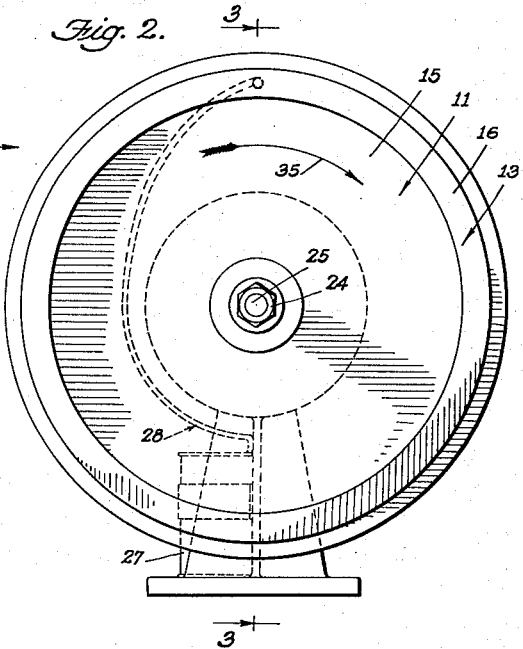
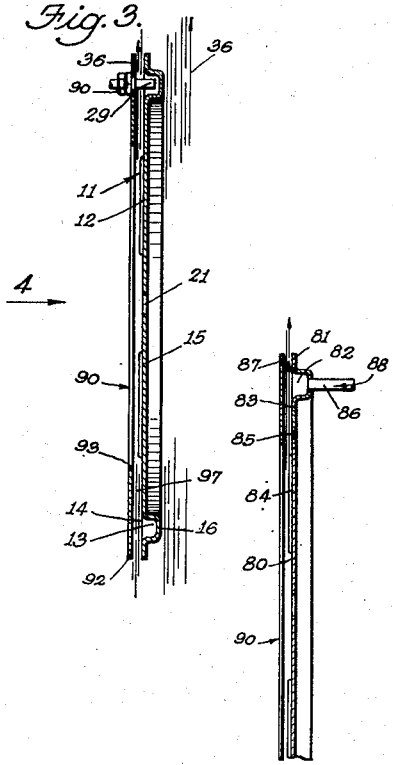
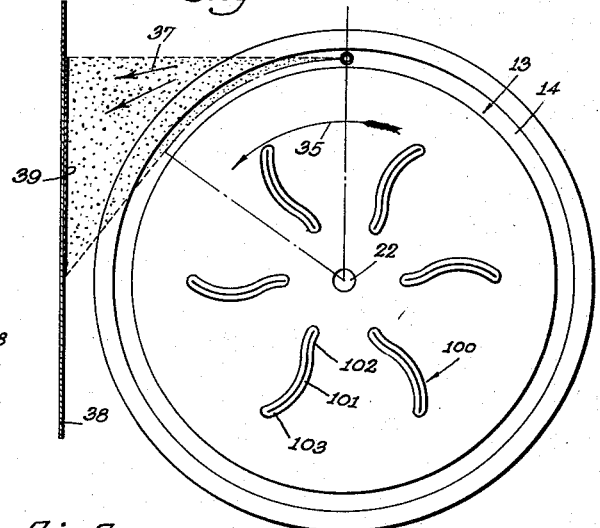
Inventor
M. A. Schwartz
By Hazard and Miller
Attorneys.

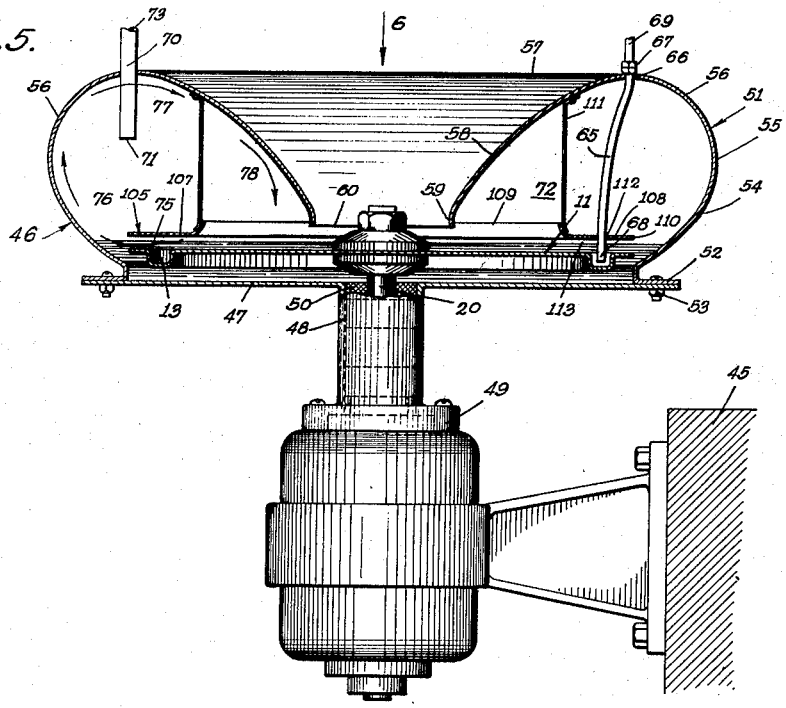

Patented Jan. 4, 1938

2,104,246

UNITED STATES PATENT OFFICE 2,104,246

CENTRIFUGAL VACUUM PUMP

Morris A. Schwartz, Los Angeles, Calif.

Application June 22, 1935, Serial No. 27,990

13 Claims. (Cl. 103—83)

I designate my invention as relating to centrifugal vacuum pumps, in that it functions as to apparatus in the creation of a vacuum which may be used to cause to flow, that is pump, liquids or gases. I use the term centrifugal in connection with my invention as I find that a simple and adequate way of developing a high velocity flow of liquids or gases to produce the vacuum is by centrifugal action.

A main object and feature of my invention is to develop a high velocity flow of liquids or gases adjacent a structure having a channel or other suitable passage, so that the flow of the liquid or gas is continuous over an open exposed part of the channel or passage and thereby operates to create a vacuum in such channel or passage. On the creation of the vacuum in the channel or passage, the liquids or gases may be caused to flow, that is pumped into such channel or passages and in such pumping action be applied to a useful purpose.

A further object and feature of my invention considered somewhat broadly, is by the substantially continuous flow of liquids or gases over an open exposed side of a channel or passage, to create a vacuum therein, flowing or pumping gases or liquids into such passage by the action of the vacuum and further causing the discharge of the liquids or gases flowing into the channel under the action of the vacuum from the channel at a high velocity by the centrifugal action of the fluid which initially causes the vacuum due to its high velocity flow.

Considered more specifically, an object and feature of my invention is to create the high velocity flow of gases or liquids by centrifugal action. This is preferably done by a substantially smooth faced disk, rotating at such high velocity that gases or liquids in contact with the face of the disk are in part caused to rotate with the disk and thereby forced outwardly by centrifugal force. This centrifugal force develops a high velocity outward flow of the gas or liquid. In connection with the high velocity flow of gases or liquids caused by the rotation of a disk, another feature of my invention resides in providing a channel or passage over the open side of which the flowing gases or liquids pass at high velocity, thus creating the vacuum in the channel or passage. Then by means of a conductor pipe or conduit or the like, a liquid or gas may be sucked into the vacuum channel and from there discharged.

A further feature of my invention relates to developing the high velocity centrifugal flow of gases or liquids by the rotation of a smooth faced disk and forming an annular channel in the disk adjacent its periphery; the channel having an open exposed side on the face of which the gas or liquid flows and thus a vacuum is created in the channel due to the flowing gases or liquids extracting air or other gases from such channel. Then by introducing the open end of a conductor pipe or conduit into the channel, a flow of liquids or gases may be developed through the conduit to the channel and then discharged from the channel by the combined centrifugal action and by the suction created by the high velocity of the centrifugal flow of the gases or liquids over the face of the disk.

A characteristic of my invention considered from the standpoint of the apparatus, is in the use of preferably a relatively light weight thin but strong disk, this being preferably flat, that is, all in the same plane except for an annular channel which channel has an opening on one face of the disk. Although gases such as air or liquids such as mercury may be given a high velocity centrifugal flow by the face of the disk having the open side of the channel, the opposite face of the disk may also develop a centrifugal flow of the gas or liquid, which combined with the flow on the opposite side of the disk, functions to create an outward flow of gas or fluid under the centrifugal action developed by the high speed of rotation of the disk.

In the application of my invention I may rotate the disk at high velocity, exposed on both sides to air so that an outward centrifugal flow of a large volume of air is developed by the centrifugal action. This flow of air over the exposed open side of the channel causes a vacuum in the channel. Then, when the open end of a conduit is inserted and held in the channel, a liquid may be pumped from a suitable vessel by suction into the channel and then discharged from the channel by the combination of centrifugal force and the suction caused by the centrifugal flow of the air. This develops a spray of extremely fine globules of the liquid, which spray may be used for very many industrial purposes.

Another example of my invention is in its application to a mercury or a similar heavy liquid type of pump. In this case the disk is preferably rotated on a vertical axis, the disk if flat, thus rotating in a horizontal plane with the open side of the annular channel being uppermost. A suitable casing encloses the disk and in this casing there is a sufficient volume of mercury or other heavy liquid to form a film on the upper surface of the disk. This film is rotated and thrown outwardly by centrifugal action and thus develops a high velocity flow of liquid over the open exposed side of the annular channel and creates a vacuum therein.

A conduit is fitted in the casing and has its open end inserted in the channel so that a vacuum is created in the conduit, which conduit may be connected to vessels to be evacuated of air or other gases. Thus by my construction and method of operation, I provide a simple type of mercury or other heavy liquid vacuum pump, in which a comparatively small amount of mercury or other liquid circulating at high velocity creates the vacuum. In this form of my invention the casing is suitably shaped to cause a return flow of the film of mercury after its discharge from the periphery of the disk back to the center portion of the disk and thus maintain a continuous circulation of a comparatively thin film of heavy liquid flowing at a high velocity.

One of the features of advantage in my invention is that I may create a satisfactory vacuum by using a small disk rotating at high speed, or a much larger disk rotating at a comparatively low speed. Also dependent on the gases or liquids to be pumped, I can vary the vacuum in proportion to the speed and weight of the gases or liquids flowing by centrifugal action over the face of the disk.

Where I use an air flow over the surface of the disk to form a vacuum, it will be understood that this may be used as a positive liquid pump, for although in one form of my invention liquid is shown as discharged in a spray, this liquid could be collected. Thus I can use the vacuum created to pump a liquid by suction from a lower to a higher level.

A further feature of my invention relates to increasing the efficiency of the device and the method, by confining the centrifugal flow of the fluid close to the face of the disk. This may be done by forcing the centrifugally driven fluid through a passage, such passage being formed by the face of the disk and a flat ring spaced from the surface of the disk. In addition I may in some cases use small ribs or impeller vanes on the face of the rotating disk to increase the centrifugal flow of the liquid.

My invention is illustrated in connection with the accompanying drawings, which drawings for the sake of simplicity are somewhat diagrammatic, in which, Fig. 1 is a side elevation of one form of my invention and may be considered as taken in the direction of the arrow 1 of Fig. 2.

Fig. 2 is an elevation taken in the direction of the arrow 2, showing the rear face of the rotating disk.

Fig. 3 is a diagrammatical section of the disk alone with a section of the suction conduit and may be considered as taken on the section 3—3 of Fig. 2 in the direction of the arrows, omitting the motor.

Fig. 4 is an elevation of the disk taken in the direction of the arrow 4 of Fig. 3, to illustrate by diagram the operation of my invention.

Fig. 5 is a side elevation partly broken away, showing another form of my invention, this being an adaptation as a high vacuum pump for exhausting gases or the like. In this illustration the liquid container and casing is illustrated in section.

Fig. 6 is a plan taken in the direction of the arrow of Fig. 6, the motor and its mounting being omitted.

Fig. 7 is a section of a modified construction showing a rotating disk and a fixed channel structure.

Referring first to the construction of Figs. 1, 2 and 3, in these I illustrate a disk 11 having a front face 12 with an annular channel 13. This channel is open on the face side of the disk as indicated at 14. The rear side of the disk 15 has the annular projection 16 made in the formation of the channel. It will be understood, however, that the disk may have sufficient thickness if desired so that the back of the channel does not protrude, or if desired the disk may have a false wall covering the projection formed by the channel on the rear side of the disk.

One manner of mounting the disk is by attaching it to a rotatable shaft. The disk is illustrated as having a perforation 21 so that it may be secured between the fixed head 22 on the shaft, a clamping head 23 and a nut 24 threaded on the threaded end 25 of the shaft. The shaft is illustrated as being driven by the electric motor 26 and for convenience may be the shaft of the rotor. The motor is shown as supported on a suitable stand 27.

A suitable pipe or conduit 28 has a discharge end 29 which is partly inserted in the annular channel formed in the disk. The inlet end 33 of the conduit is illustrated as being inserted in a supply reservoir or vessel 34, this being shown as resting on the motor base.

In the operation of my invention the disk is indicated as rotating in the direction of the arrow 35, the speed of rotation being preferably high, but this is dependent on the diameter of the disk. I find that a smooth surfaced disk is quite satisfactory and where it is desired to elevate liquids by the vacuum created in the channel 13, the disk may revolve freely with both faces exposed for a free flow of air.

In the operation of my invention the air in contact with the disk develops somewhat a rotary motion which causes a centrifugal action so that the flow of air, especially on the face of the disk, is outwardly more or less in the direction of the arrow 36. This causes a comparatively large body of air to flow over the annular opening 14 of the channel 13. The flow is so rapid that the air does not flow into the channel and then out again, but practically straight across the exposed part of the channel. This creates a partial vacuum in the channel back of the air flow. Therefore when the discharge end 29 of the suction pipe 28 is inserted partly in the channel so that its nozzle end is inside of the flow of air being drawn outwardly by centrifugal action, the suction pipe is subject to a vacuum created in the channel. This causes an upward flow of a liquid from the reservoir or receptacle 34; this liquid being discharged from the nozzle 29 into the channel.

The liquid discharged in the channel then comes under the influence of the rotating disk and also the air flow over the face of the disk so that the liquid is projected in the form of a spray, somewhat in the direction of the arrows 37 of Fig. 4, the discharge of the individual globules being more or less tangential to the channel. The spread of the discharged liquid may be varied in part by regulating the size of the pipe 28, the depth of the insertion of the nozzle end 29 in the channel, also in part by the height the liquid must be elevated and by the specific gravity of the liquid.

A practical application of my invention in the development of the spray is in applying a spray coating to a material or structure having a surface indicated at 38, in which the coating applied is indicated at 39. It is obvious that the spray can be discharged on surfaces other than those which are flat and may be applied to coating surfaces with paint or similar liquids, or if desired simply a spray may be discharged into the air.

If it is desired to use my invention merely as a suction pump for elevating liquids, the liquid discharged in the form of a spray may be collected and then either used or distributed to any suitable place. However, on account of the quite high vacuum which may be developed, liquid of not too great specific gravity may be elevated to quite a height. It will thus be seen that in the form of my invention illustrated in Figs. 1 through 4, I have produced a centrifugal vacuum pump in which air or other gases flowing by centrifugal action over the face of the disk and thus over the annular channel, create the vacuum in the channel, which vacuum is utilized to elevate liquids. It will be understood that instead of certain liquids to be elevated, gases may also be discharged through the conduit 28 and thus intimately mixed with the air or other gases causing the vacuum.

It will be obvious that the disk may be reversed so that the open side of the channel faces away from the motor. Also if desired, the disk may be rotated in any suitable plane and thus if desired may be rotated in a horizontal plane, either above or below the motor. It will also be apparent that the shaft on which the disk is mounted may be journaled in any suitable manner and rotated by any suitable means. Moreover, the disk may be comparatively small in diameter and rotated at high speed, or it may be much larger in diameter and rotated at a much lower speed.

In the adaptation of my invention as shown in Figs. 5 and 6, I provide a construction for producing a high degree of vacuum which may be used for evacuating air and gases from various vessels. In this case the base of the electric motor is illustrated as being attached to the side of a work bench or other suitable support indicated at 45, so that the shaft 20 is vertical. In this case the face of the disk has the opening of the channel 30 faced upwardly.

In the structure of Figs. 5 and 6 I employ a casing or receptacle for liquid, designated by the numeral 46. This has a base 47, preferably in the form of a circular plate, this plate being supported on a sleeve 48, the sleeve having a base 49 attached to the housing of the motor. Suitable packing 50 is fitted in the sleeve around the shaft 20 to confine liquid from flowing downwardly along the shaft while the shaft rotates.

The casing has an upward liquid flow guide 51, this being illustrated as having a flange 52 secured by bolts or the like 53 to the peripheral portion of the circular plate 47. The casing has an outward curved section 54 adjacent the bottom, curving outwardly and upwardly to the locality of greatest diameter indicated at 55. There is then an upwardly and inwardly curved section 56 terminating at the upper portions 57 and then a downwardly and inwardly curved section 58 terminating at 59, thus leaving a central opening 60 spaced above the central portion of the disk.

A suction pipe or conduit 65 passes through the opening 66, preferably in the upper portion 57 of the upper portion of the casing and may be adjusted by a nut and locknut assembly 67. The discharge or nozzle end 68 is inserted in the open channel 13 to the desired depth. The portion 69 outside of the casing connects to any suitable vessel from which gases are to be evacuated. It is preferable to have a gas relief pipe 70 secured in the casing, preferably extending downwardly from the upper portion and having an open lower end 71 located in the large space 72 defined by the upper portion of the casing. This pipe is open at its upper end 73.

In the operation of my invention as illustrated in Figs. 5 and 6, a heavy liquid such as mercury is poured into the housing or casing 46, this being sufficient to cause the complete submersion of the disk 11. As the disk rotates the film of liquid both on its upper and lower surface develops a rotational movement and when the speed is sufficiently high there is produced a centrifugal flow outwardly as indicated by the arrow 75. As the heavy liquid is driven out at high speed by the centrifugal force developed, it follows the contour of the inner wall of the upper portion of the casing, the general direction of flow being indicated by the arrows 76, 77 and 78. As this flowing liquid passes at a high velocity over the open channel 13 of the disk, it creates a vacuum in this channel, this being by the exhaustion of the air in the channel due to the movement of the liquid. As the nozzle of the suction pipe 65 is inserted in the channel, below the lower surface of the flowing liquid, it is subject to the vacuum created in the channel and thus develops a flow of gas from the vessel to be evacuated into the channel. This gas is continually expelled from the channel by the flowing liquid and separates from the liquid in the space 72 formed by the upper portion of the casing.

Under most conditions of operation, the gases drawn in through the pipe 65 into the channel and disseminated from the channel and which separate from the liquid, may flow out through the opening 60. However, when the flow is sufficiently rapid and the liquid heavy, such as mercury, sometimes the flowing liquid passing downwardly on the downwardly curved wall section 58, forms such a thick and solid body, that the gas cannot readily escape, but tends to develop a pressure inside the hollow structure formed by the casing. The pipe 70 which forms a connection to atmospheric air or to any suitable place of exhaust, allows free outflowing of the gas collected in the casing and thus reduces the back pressure on the vacuum formed in the channel 13.

It will be obvious in all forms of my invention that the suction pipe may be stream lined in cross section and so positioned relative to the flow of the liquid or gases on the disk as to reduce the turbulence. However, the pipe is quite small in diameter compared with the thickness of the layer of air or liquid thrown outwardly by centrifugal action. It will also be obvious that the pressure equalizing pipe 70 may also be stream lined in cross section and so adjusted as to reduce the turbulence of the liquid flowing past such pipe. The liquid is discharged from the edge of the disk with a sufficient velocity that in practice it closely follows the contour of the upper portion of the casing.

It will thus be realized that with my invention I may use a comparatively small volume of mercury or other heavy liquid to create a vacuum in the channel 13 and as there is a continuous circulation maintained of this small body of liquid, it is not necessary to supply additional quantities during the operation of the machine. However, should this be necessary, an additional liquid supply may readily be poured in through the opening 60.

It will also be apparent that instead of having the driving motor below the disk, that it may be located above the disk; thus in effect suspending the shaft and the disk. It is also obvious that if desired, bearings may be used on both sides of the disk where it is found necessary to maintain the shaft from oscillation. However, due to the high speed of rotation the shaft and disk usually remain properly centered. It is also quite obvious that in the construction of Figs. 5 and 6, the lower side of the disk may be so shaped that the channel does not form an obstruction to the outward flow of the liquid. It will be noted that by my invention, that although a certain amount of heat is produced by the frictional action of a heavy liquid such as mercury reacting on the rotating disk and the housing, that this heat is readily disseminated and thus the vacuum pump may be considered as operating at cool or at normal temperatures.

In Fig. 7 I show a rotating disk 80, this having an opening for a shaft or being suitably connected to a shaft or otherwise rotated, and outside of the disk there is a flat fixed ring 81 having a channel 82. The face 83 of the fixed ring is preferably in the same plane as the front face 84 of the disk. There is a slight clearance 85 between the periphery of the disk and the inner circle of the ring, merely sufficient to give a clearance for rotation of the disk, but insufficient to allow an appreciable portion of the gas or liquid flowing over the disk by centrifugal action to pass through this space and also sufficient to prevent an appreciable amount of gas or liquid passing from the rear side of the disk to the front side.

In this construction of Fig. 7, one or more air suction pipes 86 may be connected to the channel 82 at the back of the ring 83. This avoids any pipes forming an obstruction to the flow of the liquid. Such pipes may also be used to support the fixed ring if desired, or they may be held in any suitable manner. A construction such as shown in Fig. 7 may be used in place of the setup of Figs. 1 and 2, and used as a vacuum pump or in a practical application for developing a spray of a liquid. The construction of Fig. 7 is also applicable to the high degree vacuum pump of Fig. 5 in which the fixed ring may be stationary and have the annular groove, the disk merely being a plane surfaced disk. It is obvious that if desired impeller blades or ribs may be used on the surface of the disk to more readily develop or increase the outward centrifugal flow of the gases or liquids over the surface of the disk. In the construction of Fig. 7 the gases or liquids acted upon by the rotating disk flow outwardly over the channel somewhat in the direction indicated by the arrow 87. The vacuum created in the channel causes a flow of gases or liquids through the suction pipe 86 in the direction of the arrow 88.

In this case the gases or liquids discharging into the channel are removed from the channel by the flow of the liquid. On account of the ring having the channel being stationary, there is no centrifugal force developed in the channel itself, but the flow of gases or liquids over the face of the combination of the rotating disk and the fixed ring, is sufficient to create the vacuum in the channel and to discharge liquids or gases flowing into such channel from the back through the open side of the channel.

In some cases it is desirable to increase the efficiency of the device by confining the flow of the centrifugally driven fluid close to the face of the disk at the channel. Thus in Figs. 1, 3 and 4 I utilize a channel forming assembly 90 which includes a flat annular ring 91 positioned parallel to the face of the rotating disk. This ring has its outer periphery 92 preferably located beyond the annular channel and this may be in alignment with the periphery of the disk of Figs. 1 and 3 or of the stationary ring of Fig. 7. The inner circle 93 of the ring is located well inside of the channel of Figs. 1 and 3 and preferably inside of the periphery of the rotating disk of Fig. 7. The ring is illustrated as supported on supporting arms 94 attached to the motor housing 26 or other suitable mechanism. The ring is provided with a perforation 95 Figs. 1 and 3, through which the discharge end 29 of the conduit 28 passes. This may be made adjustable by means of the nuts 96. This arrangement forms an annular passage 97 between the face of the disk on the side of the open channel and the flat ring 91.

The fluid thus driven outwardly by the centrifugal action is to a great extent confined to the passage 97 and thus the velocity of the fluid through such passage is increased, thereby creating a higher degree of vacuum in the channel with some types of fluid, than when the confining ring is omitted.

In some cases to develop the rotational movement and hence the centrifugal flow of the fluid on the face of the disk I employ ribs or impeller vanes 100 (note Figs. 1, 3, 4 and 7). These vanes may be formed by pressing sections of the disk upwardly, the vanes being more or less radial but having preferably a small S-shaped curve so that the front face 101 of each vane presses a concave curve 102 at their inner ends and a convex curve 103 at their outer ends. The convex curved portion tends to force the flowing fluid outwardly more or less tangential to the periphery of the disk.

In Figs. 5 and 6 I also use a passage forming structure designated by the assembly numeral 105 which includes the annular ring 107. This has a flat portion 108 parallel to the face of the disk and an upturned inner rim 109. The rim is located well inside of the exposed channel of the disk and the outer periphery 110 of the ring may be in alignment with the periphery of the disk. The ring is preferably supported by bracket arms 111; these arms at their lower end being secured to the upturned rim 109 and to the casing forming the flow guide 51. The flat portion of the confining ring has a perforation 112 through which the suction conduit 65 extends. There is thus formed an annular passage 113 between the upper surface of the rotating disk and the lower surface of the annular ring 107. In this case the upturned rim 109 has a partial function of causing the outwardly flowing centrifugally driven fluid to follow the passage 113.

It will be obvious that if desired the flat confining rings could be mounted to rotate with the disk and thus in effect form part of a rotor for developing a centrifugal flow of a first fluid, in which case it will be necessary to have the suction conduit enter through the peripheral portion of the passage for the outflowing fluid.

In the specification and claims where I mention a channel construction or structure or the like, this is to be defined as having an open front or top and not a closed course conduit or duct. Thus referring to the drawings, the channel 13 is defined by side walls and a bottom and has the open top or front. Likewise the channel 82 of Fig. 7 also is defined by the two concentric sides and the bottom and this being open at the top or front face.

Various changes may be made in the details of construction without departing from the spirit or scope of the invention as defined by the appended claims.

I claim:

1. In a device as described, a rotary structure having an open front channel and a face for flow of a first fluid under the influence of a centrifugal force over the channel, the channel having an elongated exposed opening to the first fluid, a conduit inserted in the channel for flow of a second fluid into the channel under the influence of a vacuum created in the channel, the second fluid being discharged from the channel in part by centrifugal force developed by the rotation of the structure and in part by the flow of the first fluid.

2. In a device as described, a rotatable structure having an elongated channel open at one side, said rotatable structure being adapted to develop a centrifugal force in a first fluid contacting such structure and to cause an outward flow over the channel, and a conduit inserted in the channel for the flow of a second fluid into such channel under the action of the vacuum created in such channel by the flow of the first fluid.

3. In a device as claimed in claim 2, a casing structure positioned to engage the first fluid after its passage over the channel and to return the first fluid to a position to be again acted upon by the rotatable structure.

4. In a device as claimed in claim 2, the rotatable structure being mounted to rotate on a vertical axis, a casing structure having a guide surface, a portion of which receives the first fluid after its outward flow over the channel and has a second portion to guide the first fluid to a position to be re-engaged by the rotatable structure towards its center and a vent connection through the casing having an open inner end substantially clear of the flow of the first fluid, said vent providing means for discharge of the second fluid accumulating in the casing to reduce an increase in pressure.

5. In a device as described, a rotatable flat disk having an annular channel open on one side its full length, a suction conduit extending into said channel, the disk in its rotation being adapted to develop a centrifugal force and outward flow of a first fluid over the open side of the channel and thereby create a vacuum in the channel, the said conduit being adapted to discharge a second fluid into the channel, the flow of the first fluid and the centrifugal action developed by the rotation of the disk being adapted to discharge the second fluid from the channel.

6. In a device as claimed in claim 5, the disk being mounted to rotate on a vertical axis, a casing structure surrounding the disk and adapted to confine a body of the first fluid, the said casing having an internal surface to guide the first fluid after its discharge from the outer edge of the disk to a position adjacent the center of the disk.

7. In a device as claimed in claim 5, the disk being mounted to rotate on a vertical axis, a casing structure surrounding the disk and adapted to confine a body of the first fluid, the said casing having an internal surface to guide the first fluid after its discharge from the outer edge of the disk to a position adjacent the center of the disk, a vent structure connected to the casing and having an open inner end positioned in a space in the casing remote from the direction of flow of the first fluid and adapted to form a vent for the second fluid accumulating in the said space.

8. In a device as claimed in claim 5, the disk being mounted to rotate on a vertical axis, a casing structure surrounding the disk and adapted to confine a body of the first fluid, the said casing having an internal surface to guide the first fluid after its discharge from the outer edge of the disk to a position adjacent the center of the disk, a vent structure connected to the casing and having an open inner end positioned in a space in the casing remote from the direction of flow of the first fluid and adapted to form a vent for the second fluid accumulating in the said space, and a flat ring positioned parallel to the disk and forming with the disk and the channel a passage for the outward flow of the first fluid over the channel.

9. In a device as claimed in claim 5, and a flat ring positioned parallel to the disk and forming with the disk and the channel a passage for the outward flow of the first fluid over the channel.

10. In a device as described, a rotatable structure adapted to develop a centrifugal flow in a fluid contacting said structure, a fixed structure having an elongated channel completely open at one side, whereby the first fluid flows over the open side of the channel, a suction conduit inserted in the channel, whereby a second fluid flows through the conduit under the action of the vacuum created in the channel by the flow of the first fluid, such first fluid in its flow over the channel being adapted to evacuate the second fluid from the channel.

11. In a device as described, a rotor having means to develop a rotational motion of a first fluid and a centrifugal outward flow of such fluid, a confining means cooperative with the rotor to form a passage for the outward flow of the fluid under centrifugal action, a structure having an elongated channel completely open on the side adjacent the passage, whereby the flow of the first fluid develops a vacuum in the said channel and a suction conduit inserted in the said channel for the flow of a second fluid into the channel.

12. In a device as described, a rotatable structure adapted to develop a centrifugal force in a first fluid and an outward flow from the center of rotation, a structure with a channel with a continuous opening exposed to the outwardly flowing portion of the first fluid and a conduit inserted in the channel for flow of a second fluid into the channel under the action of the vacuum created therein.

13. In a device as claimed in claim 12, and a confining structure adjacent the structure with the channel forming a passage for the outward flow of the first fluid over the said channel.

MORRIS A. SCHWARTZ.